Patented Dec. 2, 1924.

1,517,687

UNITED STATES PATENT OFFICE.

GUSTAV ADOLF VOERKELIUS, OF BIEBRICH-ON-THE-RHINE, GERMANY.

MANUFACTURE OF FERTILIZER BY OPENING UP PHOSPHATES WITH NITRIC ACID.

No Drawing.   Application filed August 30, 1921.   Serial No. 496,958.

*To all whom it may concern:*

Be it known that I, GUSTAV ADOLF VOERKELIUS, of Biebrich-on-the-Rhine, Germany, and resident of Biebrich-on-the-Rhine, Germany, have invented certain new and useful Improvements in the Manufacture of Fertilizer by Opening Up Phosphates with Nitric Acid, of which the following is a specification.

It is known, and has been repeatedly attempted to obtain fertilizer containing phosphoric acid and nitrogen by opening up phosphates with nitric acid. Up to now however it has not been found possible to bring such products on the market. If concentrated nitric acid is used for the opening up of phosphates, a solid product is obtained direct, whilst when working with the cheaper diluted nitric acid, a paste-like product is obtained which has to be brought into solid form by drying. In the first case the heat of reaction, in the second the heat used for drying, means considerable loss of valuable phosphoric acid soluble in water, which in the given conditions is reconverted into a residue insoluble in water. In the same way, when these products are stored, a further retrogression in the solubility of the phosphoric acid in water is noticed. Apart from the above mentioned drawbacks, the products in question are unsuitable for use as fertilizer, already because they are deliquescent and therefore quickly lose their strewing capacity. In order to eliminate the latter drawback, it has been suggested to bind the water of the nitric acid by using sulphuric acid at the same time. This however implies the drawback that a product is obtained which is less rich in nitrogen, whilst in spite of that, calcium nitrate which absorbs water and leads the phosphoric acid to regain solubility in water, remains in the end product.

According to the present invention, the process is carried out by effecting the opening up of the phosphates with the cooperation of potassium sulphate which is added in a quantity equivalent to that of the nitric acid used. In that way, the injurious calcium nitrate is converted into a calcium sulphate which absorbs two molecules of water, the end product obtained being a mixture of calcium dihydrophosphate soluble in water, potassium nitrate and gypsum, that is to say a mixed fertilizer which, in addition to phosphoric acid and nitrogen, contains also valuable potash soluble in water. This process furnishes a non-deliquescent product which retains permanently its strewing property; moreover, it offers another very important advantage because the reconversion of water soluble phosphoric acid into the insoluble kind, is avoided during the manufacture as well as during the drying period of the product, and even during storage this undesirable reconversion does not take place. An Algiers phosphate with 98% phosphoric acid soluble in water, opened up with nitric acid, contained for instance after three hours drying at 90° only 77.1% acid soluble in water, whilst the same phosphate, opened up with the same nitric acid, but with the addition of potassium sulphate, also after three hours drying at 90°, still had the original proportion of 97.2% of phosphoric acid soluble in water. As proved by the said experiment, it is therefore possible, when working by the present process, to reduce by drying the proportion of water in the paste-like reaction product such as obtained when using the much cheaper diluted nitric acid, to 10–12% usual in the trade, without any loss of phosphoric acid soluble in water.

It has been found that it is also possible to work successfully by the present process phosphates containing iron and clay, which formerly were useless for the manufacture of superphosphate, as the proportion of phosphoric acid soluble in water in the products obtained from them, decreased very strongly.

Example: 81 kg. nitric acid are mixed with 112 kg. of finely ground potassium sulphate and 100 kg. phosphate. When using nitric acid containing only the quantity of water required for forming gypsum, solid product is obtained directly, which can easily be ground. When using diluted nitric acid, a paste-like product is obtained which, by drying, preferably at not more than 90° C., can be converted into solid form and ground.

The use of sodium sulphate in place of potassium sulphate is possible, but means the loss of a valuable ingredient of the manure. Exhaustive investigations have shown that for the purposes of the present invention sulphates should be used only, that is to say the salts of other acids are excluded.

Neither should cheap potassium raw salts, nor material containing potassium waste lyes be used for the present process.

Further investigations have shown that the same potassium sulphate is partly substituted by other sulphates, or mixtures of same, as for instance by ammonium sulphate, etc. It has been found that in all these cases the undesirable reconversion of phosphoric acid soluble in water into the insoluble kind can be avoided during the manufacture and storing of the fertilizer. Products manufactured in that way, also possess and retain sufficient strewing property for practical use as a fertilizer. This is very surprising, for the magnesium and ammonia nitrates formed, represent in themselves highly deliquescent substances. The discovery of the possibility of partial substitution of potassium sulphate by magnesium sulphate and ammonium sulphate, or both has the advantage that the composition of the fertilizer can be modified within wide limits to suit the requirements of agriculture.

It has been further found that it is not necessary to use sulphate in a quantity equivalent to that of the nitric acid used, on the contrary the quantity of the sulphate, according to the properties of the raw phosphate can be limited to $3/4$, and in favourable conditions even to $1/2$ of the equivalent of the nitric acid used. Even with these limited sulphate additions it is possible to obtain products with a high proportion of phosphoric acid soluble in water and with practically sufficient durability.

Up to now it has been attempted to ensure the keeping properties of superphosphate by the presence of free acid (generally about 7–10%) whilst, however, in the case of sulphuric acid superphosphate, it is question of a non-volatile and comparatively harmless phosphoric acid, in the case of saltpetre superphosphate it is the volatile nitric acid, which very easily enters into reactions and has an injurious effect, as it causes losses of nitrogen and destruction of the bags. This fact was unknown to the manufacturers who prepared saltpetre superphosphate by mixing saltpetre superphosphate and the free nitric acid formed was lost and even caused fires.

It has now been found that when working with the sulphates mentioned in the present application, perfectly durable products can be obtained even if the quantity of the nitric acid in the opening up is so reduced that the end product contains only a very slight excess of free acid, for instance 0.1–1%.

It has also been found that it is not immaterial in which way the single components of the opening up mixture are caused to act on each other. If, for instance, to the well known opening up mixture of acid and phosphate is added the sulphate, products are obtained which smear easily and are difficult to dry. It has been found that this drawback can be avoided by first mixing the sulphate with acid, and then adding to this mixture the phosphate, or by adding the acid to the mixture of phosphate and sulphate.

I claim:

1. A process for the manufacture of fertilizer, consisting in treating phosphate bearing material with nitric acid, thereby forming calcium nitrate, in the presence of a soluble sulphate thus producing by double decomposition between the calcium nitrate and the soluble sulphate insoluble calcium sulphate and a nitrate.

2. A process for the manufacture of fertilizer, consisting in treating phosphate bearing material with nitric acid, thereby forming calcium nitrate, in the presence of an alkali metal sulphate, thus producing by double decomposition between the calcium nitrate and the alkali metal sulphate insoluble calcium sulphate and an alkali metal nitrate.

3. A process for the manufacture of fertilizer, consisting in treating phosphate bearing material with nitric acid, thereby forming calcium nitrate, in the presence of potassium sulphate, thus producing by double decomposition between the calcium nitrate and potassium sulphate insoluble calcium sulphate and potassium nitrate.

4. A process for the manufacture of fertilizer, consisting in treating phosphate bearing material with nitric acid, thereby forming calcium nitrate, and then adding to the reaction mass a quantity of potassium sulphate less than equivalent to the nitric acid applied, thus producing by double decomposition between the calcium nitrate and the potassium sulphate insoluble calcium sulphate and potassium nitrate.

5. A process for the manufacture of fertilizer comprising treating phosphate bearing material with nitric acid in the presence of potassium sulphate, the quantity of nitric acid being limited in such manner as to leave only substantially one per cent free acid in the finished product.

In testimony whereof I have signed my name to this specification in the presence of two subscribing witnesses.

Dr. GUSTAV ADOLF VOERKELIUS.

Witnesses:
HEINRICH GEMMER,
AUGUST WEINERT.